Feb. 6, 1962        B. F. MONROE        3,020,089
RETRACTABLE BELT
Filed Feb. 23, 1960        2 Sheets-Sheet 1
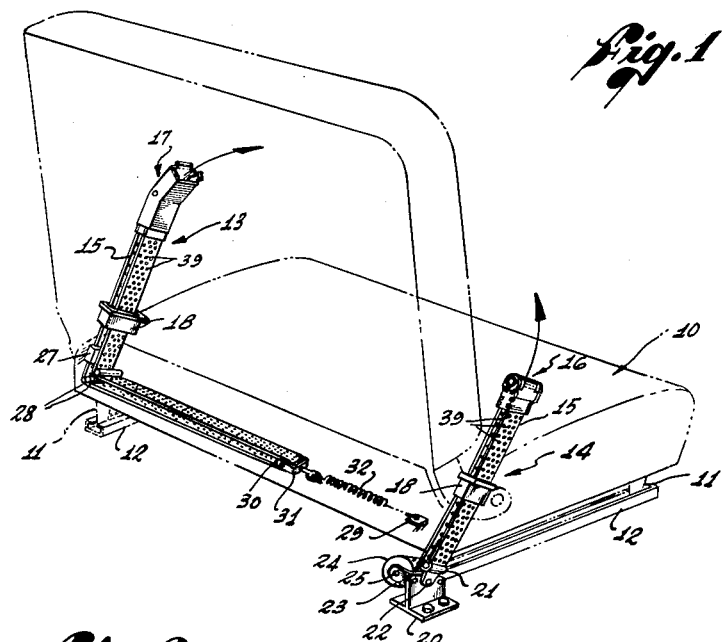
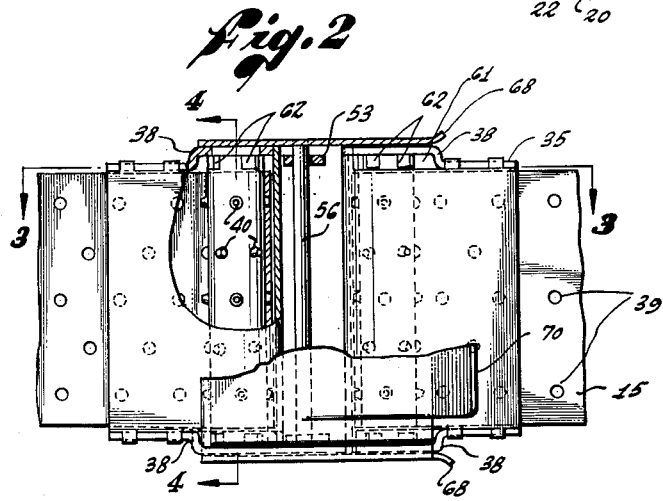
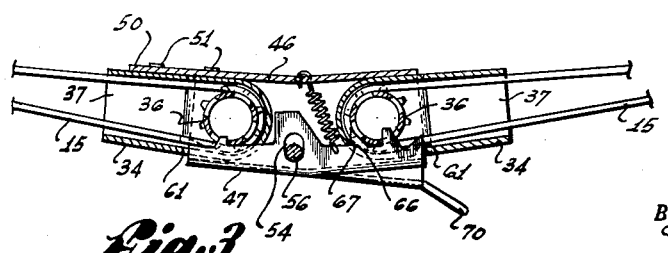
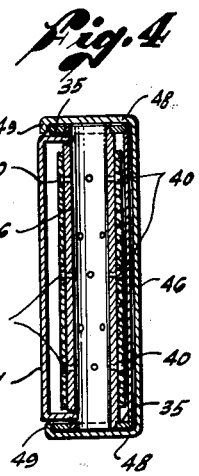
INVENTOR.
BENJAMIN F. MONROE
BY Fulwider Mattingly & Huntley
ATTORNEYS

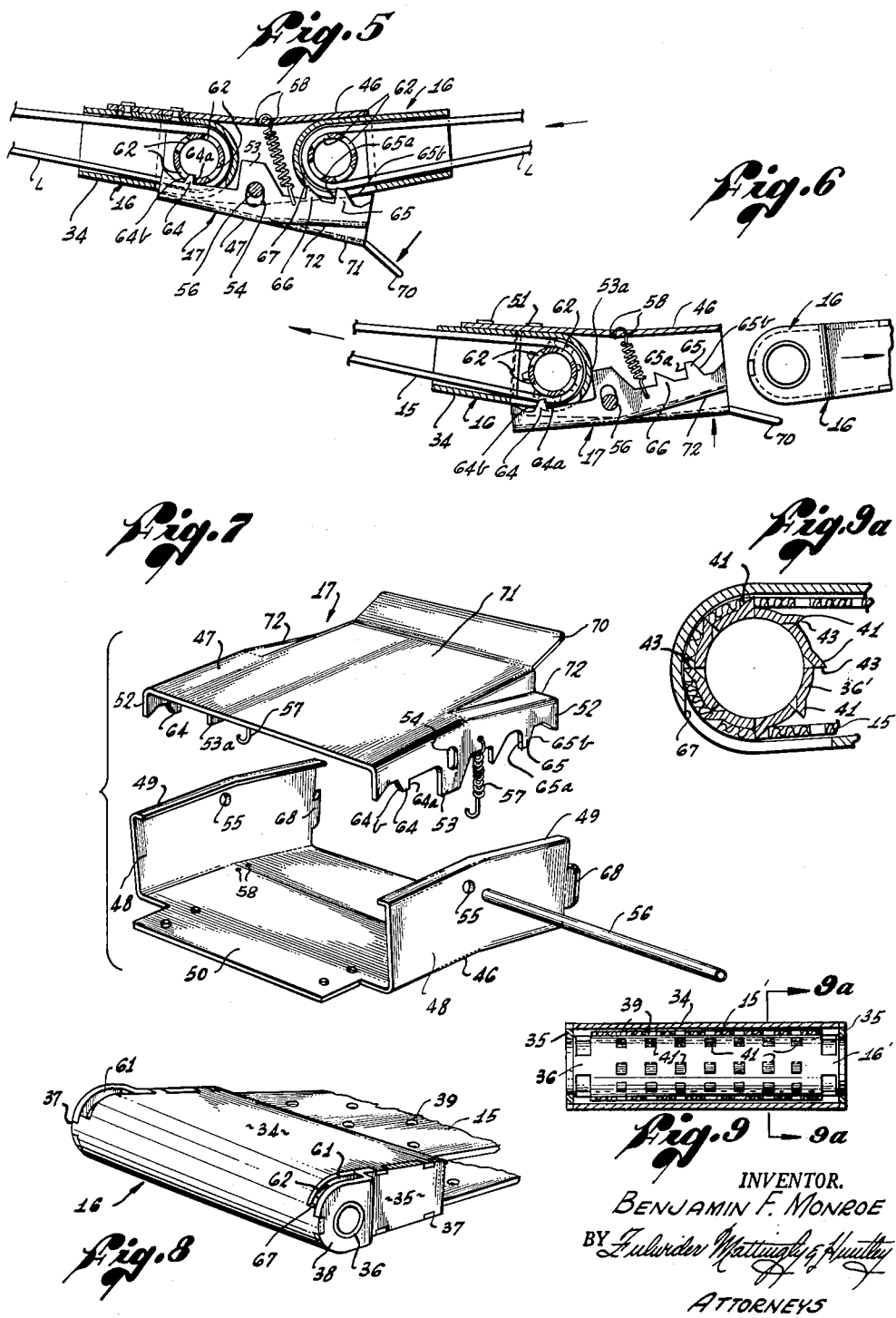

United States Patent Office 3,020,089
Patented Feb. 6, 1962

3,020,089
RETRACTABLE BELT
Benjamin F. Monroe, 1734 Benedict Canyon Drive,
Beverly Hills, Calif.
Filed Feb. 23, 1960, Ser. No. 10,464
17 Claims. (Cl. 297—388)

This invention relates generally to belts and more specifically to safety belts for aircraft and motor vehicle seats, or for cargo.

An object of my invention is to provide a safety or cargo belt that, when unbuckled, automatically and immediately returns to a retracted and protected position. This arrangement has the further advantage of increasing the service life and reliability of the safety belt since the straps do not dangle loosely so as to become soiled, or entangled, or injured by constantly being moved out of the way of the user.

Another important object of the invention is to provide a belt that is easily adjustable to the size of the person occupying the seat, or to the size of cargo. With my invention, the belt can be buckled and then contracted to conform to the size of the passenger or load, if further adjustment is necessary, the belt thereafter securely preventing the passenger or load from being displaced.

A further object of the invention is to provide a safety belt that automatically compensates for adjusting movements of the seat while retaining the feature of easy adjustment to the size of the passenger. For example, in automobiles my safety belt is semi-automatically adjustable to children or adults in any adjusted position of the seat relative to the floor of the vehicle.

Another object of the invention is to provide a safety or cargo belt in which loose ends are entirely eliminated, both in extended and retracted positions of the belt.

Another important object of the invention is to provide an entirely reliable buckle means for a retractable belt. This buckle means automatically compensates for passenger or load size and for seat adjustment and is self-locking merely by the act of bringing two buckle ends together. After locking, the buckle means can be released only upon a deliberate actuation of a portion thereof, whereupon the buckle ends release instantly and automatically return to retracted position.

Another object of the invention is to provide a greatly simplified, although entirely reliable, buckle mechanism employing identical buckle ends that are latched together by a latching means mounted on one of them.

These and other objects and advantages of my invention will be apparent from the following description of a presently preferred embodiment thereof when taken in conjunction with the annexed drawings, in which:

FIGURE 1 is a perspective view of a retractable safety belt embodying my invention, the figure showing alternative means of anchoring the safety belt with respect to a conveyance in which it is mounted;

FIGURE 2 is a fragmentary plan view showing the buckle means in closed condition as viewed from the outward side of the buckle, portions thereof being cut away to show interior details of construction;

FIGURE 3 is a sectional view along the line 3—3 of FIGURE 2;

FIGURE 4 is a sectional view along the line 4—4 of FIGURE 2;

FIGURE 5 is a view similar to FIGURE 3 but showing the parts of the buckle means in positions assumed during closing or opening;

FIGURE 6 is a view similar to FIGURE 3 but showing the parts of the buckle means as they appear when the buckle ends are separated;

FIGURE 7 is an exploded perspective view of a portion of the latch means of the buckle;

FIGURE 8 is a partial perspective view of one of the identical buckle ends;

FIGURE 9 is a view similar to FIGURE 4 of another form of buckle cob construction; and FIGURE 9a is a sectional view on the line 9a—9a of FIGURE 9.

While the invention is disclosed herein as adapted for passenger seats, it will be apparent to those skilled in the art that the invention can be readily adapted for cargo use.

Referring now to the drawings and in particular to FIGURE 1, a passenger seat 10 is shown somewhat schematically in dotted outline and has leg assemblies 11 movably mounted in floor tracks 12. Although not shown, it will be understood that a latching means is provided for securing the seat 10 in an adjusted position on the tracks 12 and the tracks, in turn, are supported on the floor of an aircraft or motor vehicle.

A pair of independently retractable belt assemblies 13 and 14 are mounted on opposite sides of the seat 10. Both of these belt assemblies include a strap 15 and a buckle end 16. One of the belt assemblies, in this instance the belt assembly 13 on the left hand side of the seat 10, has a buckle latch 17 mounted on its buckle end 16. When the safety belt is mounted in a motor vehicle, both of belt assemblies 13 and 14 are preferably secured to the floor or frame in the manner shown for the right hand belt assembly 14. When the safety belt is to be mounted in an aircraft, both belt assemblies are preferably mounted on the seat in the manner of the left hand belt assembly 13. Thus, it is to be understood in the representation of FIGURE 1 that the different anchoring means for the belt assemblies 13 and 14 are illustrated as alternatives, depending upon thhe use to which the safety belt is to be applied.

In general, the safety belt comprises a pair of straps 15, each of the straps having one fixed end and one retracting end. One of the buckle ends 16 is drivably engaged in a running bight of each strap 15 and the other of the buckle ends is provided with the aforementioned latch means 17. The retracting end of each strap 15 is resiliently biased towards retracted position to normally maintain the buckle ends of the straps 15 seated within suitable brackets 18 mounted on the seat structure. To use the safety belt, the buckle ends of the two belt assemblies are grasped and pulled out of their brackets 18, which causes the resiliently biased flights of the straps to be payed out until the buckle ends can be brought together in front of the body. One of the buckle ends is then inserted into the latch 17 and the buckled safety belt then retracts or is retractable to a size conformable to the size of the occupant and the adjustment of the seat 10. Thereafter the safety belt can be released only upon a deliberate actuating force applied to a handle on the latch 17.

More specifically, considering first a motor vehicle installation, the strap 15 has one fixed end, the other end being connected to a spring-loaded windup reel. Thus, referring to the belt assembly 14 in FIGURE 1, a substantially T-shaped anchor plate 20 is affixed to the motor vehicle frame or floor. A clamp device 21, or the like, is secured to one end of the strap 15 and is in turn pivotally secured at 22 to an upstanding flange of the anchor plate 20.

The anchor plate 20 also has a yoke 23 mounted thereon between whose arms a reel 24 is rotatably supported. This reel may be of conventional construction and accordingly will not be illustrated nor described in detail. Suffice it to say that the reel mechanism includes a rotor 25 to which the other end of the strap 15 is secured. A torsion spring (not shown) is drivingly engaged with this rotor to wind up the strap 15 onto the reel 24. Both flights of the strap 15 ascend from the reel 24 and clamping device 21 through the fixed bracket 18 and the bight of the strap is mounted within a buckle end 16.

In an aircraft seat installation the strap 15 has both ends secured to an anchor plate 27 fastened to the seat framework, and this is illustrated in connection with belt assembly 13 of FIGURE 1. The belt 15 is thus continuous, in effect, and has two running bights. One of these bights is on the buckle end 16, which is substantially fully concealed from view within the latching mechanism 17. The other of these bights is at the extremity of a pair of horizontal flights of the belt 15 extending under the seat. The horizontal flights of the belt 15 are suspended between a pair of guides 28, affixed to the seat framework beneath the anchor 27, and a member 29, affixed to the seat framework beneath the seat and remotely from the guides 28. These horizontal flights of the strap 15 have a bight around a roller 30 journaled in a yoke 31. A coil spring 32 is connected at one end to the yoke 31 and at its other end to the member 29 and thus is adapted to bias the belt assembly 13 to a retracted position. It will be understood that in the retracted position the buckle end and latch mechanism 17 are seated in the corresponding bracket 18.

Each buckle end 16 consists of a cover 34, a pair of end plates 35, and a cob 36 drivingly engaged to the belt 15. The cover 34 is substantially U-shaped in configuration and has a rounded leading edge. The end plates are mirror images of one another and are affixed to opposite sides or open ends of the cover 34 with tongue and groove connections 37, the parts being brazed together. At their front ends the end plates 35 have outwardly offset portions 38 in which opposite ends of the cob 36 are journaled.

It will be observed that the cob has its axis of rotation coincident with the axis of curvature of the leading edge of the cover 34. The belt 15 is formed with a plurality of perforations 39 that are adapted for driving engagement with a plurality of rows of teeth 40 protruding outwardly from the cob 36. As can best be seen in FIGURE 3, a semi-annular guide space is defined between the outer surface of the cob 36 and the inner surface of the leading edge of the cover 34, in which the running bight of the belt 15 is channeled.

It will be noted that the cob teeth 40 are frusto-conical in configuration and adapted for engagement with round perforations 39 in the belt 15. In order to avoid concentrations of stress in localized portions of the material of the belt 15 the perforations 39 are arranged in alternate ranks of two's and three's and the cob teeth 40, are, of course, similarly distributed around the circumference of the cob 36. However, other configurations of cob teeth and belt perforations are permissible, as, for example, are shown in FIGURES 9 and 9a.

In FIGURE 9, the buckle end is similar to that previously described but has a cob 36' formed with teeth 41 which are elongated in a direction axially of the cob. The teeth 41 may be formed from outstruck portions of material of the cob 36 and as shown in FIGURE 9a are adapted for a unidirectional driving engagement with the belt 15, having abutment faces 43 disposed radially of the cob. In this instance a belt 15' is formed with ranks of perforations 42 which are substantially rectangular in plan view and similarly elongated transversely of the belt 15. Abutment faces 43 of the teeth 41, when disposed on the outward side of the cover 34 face away from the fixed end of the belt 15, since it is the outside flight of the belt which assumes the loads when the belt is buckled.

The buckle latching mechanism 17 comprises a channel 46 pivotally mounting an actuating handle 47. The channel 46 has a pair of opposite side walls 48 that are formed along their outer edges with inwardly turned flanges 49. The spacing of the flanges 49 above the web of the channel 46 is such as to slidably accommodate the thickness of a buckle end 16 and the width between the side walls 48 is such as to slidably accommodate the width of a buckle end, i.e., the length of a cob 36. In order to secure one of the buckle ends 16 to the channel 46 the web of the channel is lengthened at one end as by a rearwardly extending tab 50. As is shown in FIGURE 3, rivets 51, or other suitable fastening means, are utilized to secure the buckle end assembly 16 permanently in place within the end of the channel 46.

The latch handle 47 is of substantially the same length as the side walls 48 of the channel 46 and along a pair of opposite edges is formed with downwardly turned flanges 52 adapted to be received between the edges of the flanges 49 of the channel. The flanges 52 also serve as guides for opposite edges of the belt 15 to prevent fouling the latch mechanism. Each of these latch flanges, near its center, has an enlarged tab 53 in which an elongated slot 54 is formed. The pair of slots 54 are adapted for registration with a pair of bores 55 formed in the channel side walls 48, adjacent the midpoint of the channels, and immediately beneath the overhanging flanges 49. To pivotally support the handle 47 on the channel 46, a rod 56 extends through the aligned bores and slots 55 and 54.

It will be observed that both the latch handle 47 and channel 46 are bent about a transversely extending midline. The pivot axis for the latch handle 47 is located adjacent the midline in that half portion of the handle and channel to which one of the buckle ends 16 is affixed. A pair of small coil springs 57 are each connected at one end to one of the handle flanges 52 immediately adjacent to and on the opposite side of the transverse midline of the handle from its pivot axis, and each of these springs has its other end hooked through a pair of small holes 58 formed in the web of the channel 46 along the transverse midline of the channel.

The springs 57 bias the handle 47 into the position shown in FIGURE 6. It will also be noted that the configuration of the latch assembly disposes the belt ends in an angularly related position so that when the safety belt is fastened the connection conforms somewhat to the curvature of the body of the user. FIGURE 2 shows the safety belt buckled and it will be noted that the belt ends 16 are disposed within the latch mechanism 17 only to the extent of the length of the offset portions 38 of the end caps 35.

Referring now to FIGURE 8, the outer face of the buckle cover 34 is visible. It will be noted that a pair of clearance slots 61 are defined in the leading edge of the outer face of the cover, each of the slots extending forwardly from the joggle of the end cap 35, almost to the extreme front edge of the cover 34. The cob 36 of each buckle end 16 has a plurality of notches 62 formed in each of its ends and these notches are exposed through the clearance slots 61. The clearance slots 61 are also disposed within the same planes as the handle flanges 52 and the edges of the flanges are provided with detents that are engageable with the cob notches 62 for buckling the safety belt.

The edge of each flange 52 is formed with a detent 64 overhanging a cob end of the fixed buckle end 16 and another detent 65 overhanging a cob end of the releasable buckle end. Both of these detents are adapted for ratcheting engagement with the notches 62 of one of their respective cobs. Thus the detent 64 has a face 64a adapted for unidirectional latching engagement with one edge of the notches 62 of a cob. Another face 64b of the detent 64 is sloped and thus adapted for camming engagement with the opposite edges of the notches 62 of a cob 36. Similarly, the detent 65 has a face 65a for unidirectional latching engagement with one edge of the cob notches and another sloping face 65b adapted for camming engagement with oposite edges of the notches. In addition, each handle flange 52 is also formed with pointed dog 66, that is engageable with the forward edge 67 of the clearance space 61 in the buckle 16, to aid the detents in avoiding unlatching of the mechanism.

FIGURE 6 illustrates the disposition of the latch handle 47 when the safety belt is unbuckled. It will be noted that the springs 57 have biased the forward or open end of the handle downwardly and the pair of detents 64 are thus raised clear of the notches 62 of the corresponding cob 36. The belt assembly 13 can thus be extended merely by grasping the channel 46 and pulling on it and the traveling bight of the belt 15 thus induces rotation of the cob 36 to elongate the belt. The other belt assembly 14 is similarly elongated merely by grasping its buckle 16 and pulling on it whereby the traveling bight of its belt 15 similarly causes elongation of the belt.

In order to fasten the seat belt the buckle 16 of the assembly 14 is merely inserted into the open end of the channel 46. In this connection it will be noted that the latch handle 47 in its portion overhanging the open end of the channel has a finger engageable tab 70 that is angularly related to another portion 71 which, in turn, comprises a continuation of the plane of the other half portion of the handle 47. However the portion 71 is of lesser width than the handle 47, being formed with a step 72 along each side. These steps are engageable by the leading edge of the buckle cover 34 and the cover is thus cammed to the position shown in FIGURE 5 by the act of sliding the buckle into the channel 46. In order to facilitate alignment and entry of the free buckle 16 into the channel 46 the side walls 48 of the channel at the open end thereof have integral oppositely outwardly flared extensions 68. Referring to FIGURE 3, which shows the buckles latched together, it will be noted that the configuration of the tab 70 and portion 71 of the handle 47 provide ample clearance space for the entry of fingers between the tab and the cover 34 of the free end buckle 16 whereby release of the latching engagement is facilitated.

Referring again to FIGURE 5, it will be seen that the act of slipping the free end buckle 16 into the channel 46 lifts the handle 47 against the tension of the springs 57. At the same time the handle 47 is pivoted about the rod 56, the rod being seated against the innermost end of the slots 54. If the detents 64 are then in registration with pairs of the notches 62 of its associated cob 36, the detents will engage the notches. However, the slots 54 have sufficient length to permit the forward or open end of the handle 47 to raise sufficiently to receive the buckle even though the detents 64 fall into engagement with the full diameter lands between notches of the cob 36.

When the free end buckle 16 has been inserted into the channel 46 a sufficient distance to bring its cob beneath the pair of detents 65, the pair of springs 57 will tend to pull the handle 47 back to the position shown in FIGURE 3, wherein the slots 54 have their outermost ends seated on the rod 56. If a pair of the notches 62 of the free end cob 36 are in registration with the pair of detents 65, these detents will then fall into the locking engagement shown in FIGURE 3. If the disposition of the free end cob 36 is such that full diameter portions thereof are disposed opposite the pair of detents 65, both cobs can nevertheless be locked merely by allowing the belt assembly to contract slightly, or by pulling to slightly elongate the belt 15.

The faces 64b and 65b of the detents can be given such a slope as to be cammingly overridden by edges of the notches 62. The safety belt is then automatically adjustable to the size of the passenger. Thus, in FIGURE 3 the windup or retracting springs of each belt assembly exert their force on the innermost flights of the belts 15 and the left hand cob 36 is accordingly urged in a counterclockwise direction while the right hand cob 36 is urged in a clockwise direction. It will be understood that the force of the retracting spring means is not sufficient to cause discomfort to the occupant of the seat but the spring means nevertheless has sufficient force to retract the belts 15 to a size comfortably encompassing the girth of the occupant.

The seat belt being latched as illustrated in FIGURE 3, the passenger is securely held against being thrown out of the seat in the event of any accident. It will be noted that the roots of the detents 65 are seated against the outer surface of the free end cob 36 while at the same time the steps 72 of the handle 47 are closely adjacent to the outer face of the cover 34. Accordingly, if an accidental inward force is applied to the tab 70 of the handle 47 the detent 64 is prevented from lifting out of latched engagement with the notches 62 of the fixed end cob 36.

In order to release the safety belt it is merely necessary to slip a finger or two beneath the handle tab 70 to pull the tab outwardly in the manner shown in FIGURE 5. The detents 65 and dogs 66 are thus raised out of latching engagement with the cob notches 62 and slot edge 67, respectively. The retracting spring means exerted on the inner flight of the belt 15 retracts the belt assembly 14 until the free end buckle 16 is seated in the bracket 18. In order to prevent the free end buckle 16 from whipping about, it is preferable that the user keep it in hand to guide it into place in the bracket 18.

After release of the free end buckle 16 the springs 57 pull the handle 47 to the position shown in FIGURE 6. Referring to FIGURE 6, it will be noted that the tabs 53 have corners 53a which contact the rounded face of the cover 34 to limit retraction of the handle 47. The detents 64 are thus lifted out of latching engagement with the associated cob 36 so that the left belt assembly 13 can be similarly retracted into its bracket 18.

Variations in the construction and mode of operation of the retractable safety belt described above will undoubtedly occur to those skilled in the art. For example, one buckle element can be fixed and but one extendible strap, with another buckle element, may be employed. However, it is to be understood that I do not mean to be limited to the specific details of construction as set forth above but only by the spirit and scope of the following claims.

I claim:

1. In a restraint device, the combination comprising: at least one strap; means for mounting said strap to define at least one running bight in said strap; means to anchor a flight of said strap leading away from said bight; means engaged with the other flight of said strap leading away from said bight to yieldably exert a retracting force on said strap; and buckle means including a pair of complementary elements one of which has a rotatable member drivingly engaging the bight of said strap, said one element being adapted to releasably engage the other of said buckle elements, said buckle means locking said member against rotation when said elements are releasably engaged.

2. In a belt, the combination comprising: a pair of straps; means to anchor one end of each of said straps; means engaged with the other end of each of said straps to yieldably exert a retracting force on said straps; a pair of complementary buckle elements for said pair of straps each of which elements has a rotatable member drivably mounted on a running bight of the corresponding one of said straps and means releasably interconnecting said buckle elements for locking said members against rotation.

3. In a belt, the combination comprising: a pair of straps; means for mounting said straps to define at least one running bight in each of said straps; means to anchor a flight of each of said straps leading away from said bight; means engaged with the other flight of each of said straps leading away from said bight for adjustably controlling the extension of said bight relative to the location of said means to anchor a flight of said strap; a pair of rollers each of which is drivably mounted on a running bight of one of said straps; and means to releasably interconnect said rollers to hold said rollers against rotation.

4. In a belt, the combination comprising: a pair of straps; means for mounting said straps to define a pair of running bights in each of said straps; means to anchor a flight of each of said straps at a location between said pair of bights; means engaged with one bight of each of said straps to exert a retracting force on said straps; and buckle means comprising a pair of elements each of which elements is mounted on the other bight of one of said straps and each of which elements is adapted to releasably engage the other of said elements.

5. In a belt, the combination comprising: a pair of straps; means for mounting said straps on a seat to define a running bight in each of said straps; means to anchor a flight of each of said straps leading away from said bight; means engaged with the other flight of each of said straps leading away from said bight to yieldably exert a retracting force on said straps; and buckle means including a pair of elements each of which elements is mounted in the running bight of one of said straps in driving engagement with said strap whereby to extend said straps by pulling on said elements, said buckle means also being adapted for releasably locking said elements and straps against movement.

6. In a belt, the combination comprising: a pair of straps; means for mounting said straps on a seat to define at least one running bight in each of said straps; means to anchor a flight of each of said straps leading away from said bight; means engaged with the other flight of each of said straps leading away from said bight to yieldably exert a retracting force on said straps; a pair of buckle elements through each of which one of said bights passes, each of said elements including a cob over which said bight runs in driving engagement with said cob; and a latching means for releasably interconecting said pair of buckle elements and adapted to prevent rotation of said cobs in a direction to extend said straps when said buckle elements are interconnected.

7. In a belt, the combination comprising: a pair of straps; means for mounting said straps on a seat to define at least one running bight in each of said straps; means to anchor a flight of each of said straps leading away from said bight; means engaged with the other flight of each of said straps leading away from said bight to yieldably exert a retracting force on said straps; a pair of buckle elements through each of which one of said bights is guided for driving engagement with a cob journaled in each of said elements, said straps being formed with a plurality of perforations spaced therealong that are penetrable by teeth formed on said cobs; and a latch mounted on one of said buckle elements that is releasably engageable with the cobs of both of said elements to prevent extension of both of said straps.

8. In a belt, the combination comprising: a pair of straps; means for mounting said straps to define at least one running bight in each of said straps; means to anchor a flight of each of said straps leading away from said bight; means engaged with the other flight of each of said straps leading away from said bight to yieldably exert a retracting force on said straps; a pair of buckle elements through each of which one of said bights passes, each of said elements including a cob over which said bight runs, said cobs and said straps having driving engagement with one another; a channel having one of said elements affixed to one end thereof and adapted to receive the other of said elements through the other end thereof; and a latch pivotally mounted on said channel having detents selectively engageable with notches formed in said cobs, said detents and notches being adapted for unidirectional locking engagement to prevent extension of the anchored flights of said straps and also adapted for unidirectional overriding engagement to permit retraction of the other flight of said straps.

9. In a seat belt, the combination comprising: a pair of straps; means for mounting said straps on a seat to define at least one running bight in each of said straps; means to anchor a flight of each of said straps leading away from said bight; means engaged with the other flight of each of said straps leading away from said bight to yieldably exert a retracting force on said straps; a pair of buckle elements through each of which one of said bights passes, each of said elements including a cob over which said bight runs in driving engagement with said cob; a channel having one of said elements affixed to one end thereof and adapted to receive the other of said elements through the other end thereof; a latch pivotally mounted on said channel having pairs of detents selectively engageable with notches formed in the opposite ends of said cobs, said detents and notches being adapted for unidirectional locking engagement to prevent extension of the anchored flights of said straps and also adapted for unidirectional overriding engagement to permit retraction of the other flight of said straps; and spring means interconnecting said latch and said channel to pivotally bias said latch to a position in which one pair of said detents is withdrawn from the notches of the one of said cobs in a buckle element affixed to said channel, said latch having a lost-motion connection to said channel about the pivot axis of said latch, the other of said buckle elements when inserted into said other end of said channel causing pivotal movement of said latch against the force of said spring means and simultaneously displacing said latch against the force of said spring means within the limits of said lost-motion connection whereby said one pair of detents move into engagement with the notches of the corresponding one of said cobs, said spring means also causing the other pair of said detents to be biased into engagement with the notches of the other of said cobs after said other buckle element has been inserted into said channel.

10. In a belt, the combination comprising: a pair of straps; an anchor pivotally connected to one end of each strap; a pair of spring-loaded retracting reels each of which is connected to the other end of one of said straps; and buckle means including a pair of complementary elements each of which elements is mounted on a running bight of one of said straps, said buckle means being adapted to releasably interconnect said elements to prevent running of said bights.

11. In a belt, the combination comprising: a pair of straps; an anchor pivotally connected to one end of each strap; a pair of spring-loaded retracting reels each of which is connected to the other end of one of said straps; a pair of buckle elements through each of which a running bight of one of said straps is guided for driving engagement with a cob rotatably mounted in each of said elements, said straps being formed with a plurality of perforations spaced therealong that are penetrable by teeth formed on said cobs; and a latch mounted on one of said buckle elements that is releasably engageable with the cobs of both of said elements to prevent extension of both of said straps.

12. In a restraint device, the combination comprising: at least one strap having a running bight; a buckle end for said strap through which said bight runs over a rotatable member drivably engaged by said bight; and a latch means for receiving said buckle end to releasably lock said member against rotating in one direction to hold said straps against movement in a corresponding direction.

13. In a restraint device, the combination comprising: at least one extendible and retractable strap having a running bight; a buckle end for said strap through which the bight of said strap is guided; a rotatable member in said buckle end over which said bight runs, said member having driving engagement with said strap; and a latch means for releasably locking said member against rotation whereby to limit extension of said strap.

14. In a belt, the combination comprising: a pair of extendible and retractable straps each having a running bight; a pair of buckle ends for said straps through each of which ends the bight of the corresponding one of said straps is guided; a rotatable cob in each of said buckle ends over which said bights run, said straps having a plurality of perforations spaced longitudinally thereof and said cobs having a plurality of teeth spaced circumferentially thereof and adapted for driving registration with said perforations as said bights run over said cobs; and a latch connected to one of said buckle ends that is selectively engageable with both of said cobs, said latch and cobs having locking engagement means to prevent rotation of said cobs in a direction to extend said straps.

15. In a belt, the combination comprising: a pair of extendible and retractable straps each having a running bight; a buckle end for each of said straps having a cob rotatably mounted therein, said buckle end having a semicylindrical leading edge that is coaxial with the axis of said cob, said leading edge and said cob defining a semiannular space therebetween for maintaining said bight on said cob, said straps having a plurality of perforations spaced longitudinally thereof and said cobs having a plurality of teeth spaced circumferentially thereof, said teeth being adapted for driving registration with said perforations as said bights run over said cobs; a channel having one of said buckle ends affixed to one end of said channel and adapted to receive the other of said buckle ends through the other thereof; and a latch pivotally mounted on said channel having detents selectively engageable with notches formed in said cobs, said detents and notches being adapted for unidirectional locking engagement to prevent extension of said belts and also adapted for unidirectional overriding engagement to permit retraction said belts.

16. In a belt, the combination comprising: a pair of extendible and retractable straps each having a running bight; a buckle for each of said straps having a cob rotatably mounted therein, said buckle having a semicylindrical leading edge that is coaxial with the axis of said cob, said leading edge and cob defining a semiannular space therebetween for maintaining said bight on said cob, said straps having a plurality of perforations spaced longitudinally thereof and said cobs having a plurality of teeth spaced circumferentially thereof and adapted for driving registration with said perforations as said bights run over said cobs; a channel having one of said buckles affixed to one end thereof and adapted to receive the other of said buckles through the other end thereof; a latch pivotally mounted on said channel having pairs of detents selectively engageable with notches formed in the opposite ends of said cobs, said detents and notches being adapted for unidirectional locking engagement to prevent extension of said straps and also adapted for unidirectional overriding engagement to permit retraction of said straps; and spring means interconnecting said latch and said channel to pivotally bias said latch to a position in which one pair of said detents is withdrawn from the notches of the one of said cobs in the buckle affixed to said channel, said latch having a lost-motion connection to said channel about the pivot axis of said latch, the other of said buckles, when inserted into said other end of said channel, causing pivotal movement of said latch against the force of said spring means and simultaneously displacing said latch against the force of said spring means within the limits of said lost-motion connection whereby said one pair of detents moves into engagement with the notches of the corresponding one of said cobs, said spring means also causing the other pair of said detents to be biased into engagement with the notches of the other of said cobs after said other buckle has been inserted into said channel.

17. In a restraint device, the combination comprising: a strap; a buckle end having a rotatable member around which a running bight of said strap is trained, said member having driving engagement with said strap; another buckle end, complementarily engageable with said first mentioned buckle end for bringing said buckle ends into operative alignment; and latch means for releasably interconnecting said buckle ends and releasably locking the rotatable member against rotation to effect locking of said strap against movement on said rotatable member.

References Cited in the file of this patent

UNITED STATES PATENTS

| | | |
|---|---|---|
| 2,071,903 | Shively | Feb. 23, 1937 |
| 2,468,560 | Kirkpatrick | Apr. 26, 1949 |
| 2,590,851 | Elsner | Apr. 1, 1952 |
| 2,710,999 | Davis | June 21, 1955 |

UNITED STATES PATENT OFFICE
CERTIFICATE OF CORRECTION

Patent No. 3,020,089                              February 6, 1962

Benjamin F. Monroe

It is hereby certified that error appears in the above numbered patent requiring correction and that the said Letters Patent should read as corrected below.

Column 6, line 63, after "straps" insert a semicolon; column 7, line 37, for "interconecting" read -- interconnecting --; column 9, line 26, for "of", second occurrence read -- thereof --; line 27, strike out "said channel"; line 28, for "thereof" read -- end of said channel --; same column 9, line 34, after "retraction" insert -- of --.

Signed and sealed this 19th day of June 1962.

(SEAL)
Attest:

ERNEST W. SWIDER
Attesting Officer

DAVID L. LADD
Commissioner of Patents